United States Patent [19]
Couch

[11] 3,854,756
[45] Dec. 17, 1974

[54] CONDUIT SYSTEM

[75] Inventor: Robert O. Couch, Wadsworth, Ohio

[73] Assignee: Ric-Wil, Incorporated, Brecksville, Ohio

[22] Filed: Apr. 19, 1973

[21] Appl. No.: 352,511

[52] U.S. Cl. .............................................. 285/47
[51] Int. Cl. ........................................... F16l 11/12
[58] Field of Search................ 285/47, 53, DIG. 5; 138/149

[56] References Cited
UNITED STATES PATENTS

| | | | |
|---|---|---|---|
| 3,402,731 | 9/1968 | Martin | 285/47 |
| 3,453,716 | 7/1969 | Cook | 285/47 |
| 3,575,445 | 4/1971 | French | 285/47 |
| 3,744,823 | 7/1973 | Muir et al. | 285/47 |

Primary Examiner—Patrick D. Lawson
Attorney, Agent, or Firm—Watts, Hoffmann, Fisher & Heinke

[57] ABSTRACT

A conduit system is disclosed which comprises first and second conduit units which are sealingly joined together by a separate coupling unit. Each conduit unit includes a central pipe having projecting end portions which are received by the coupling unit. The coupling unit comprises an annular tubular body member for receiving the adjacent pipe end portions and sealing the junctures of the pipe ends and the coupling body. The annular body is surrounded by a generally cylindrical body of insulating material formed from polyurethane foam which is interlocked with the annular body. A protective jacket extends about the insulating material.

11 Claims, 5 Drawing Figures

CONDUIT SYSTEM

BACKGROUND OF THE INVENTION

1. Field of the Invention

The present invention relates to conduit systems and more particularly relates to conduit systems in which adjacent ends of conduit units of the systems are sealingly coupled in the field during installation.

2. The Prior Art

The prior art has proposed conduit systems in which individual conduit units of the system carry an integral coupling arrangement for sealingly coupling adjacent ends of two conduit units together. While such coupling units have enabled thermal expansion and contraction of pipes in the conduit units while maintaining a sealed relationship between the pipes, the construction of conduit units with integral couplings has complicated the process by which the conduit units are constructed thereby increasing the cost of the conduit units.

Some prior art conduit systems were susceptible to ground water infiltration of the insulation around the pipes in the conduit units as a result of thermal expansion and contraction of the pipe breaking seals at the ends of the conduit sections.

Furthermore, conduit systems employing conduit units having built-in or integral couplings have been difficult to assemble in the field and damage to, or leakage from, a single coupling necessitated replacement of entire conduit units which were otherwise undamaged.

When conduit systems were being field installed it was frequently necessary to cut off lengths of some of the conduit units in order to fix them to pipe anchoring devices. Where conduit units which employed couplings fixed in one end were used, the cut off portion of the conduit units was unusable. As a consequence, to avoid excessive waste, the conduit units were frequently of relatively short overall length, e.g. 10 feet long.

SUMMARY OF THE INVENTION

The present invention provides a conduit system including a plurality of conduit units having internal pipes, adjacent ends of which are communicated through separate coupling units which seal the pipes. The coupling units permit thermal expansion and contraction of the conduit unit pipes without loss of the sealed relationship between them. The coupling units are easily and quickly installed in the field while permitting use of relatively long conduit sections without wasting cut off portions of conduit sections.

Coupling unit constructed according to a preferred embodiment of the present invention comprise a generally annular corrosion resistant coupling body which defines an internal passageway for receiving adjacent end portions of pipes of adjacent conduit units. The pipes are sealingly engaged with the annular body but are axially movable relative to the annular body to accommodate for thermal expansion and contraction of the pipes.

The coupling body is surrounded by a body of insulating material which is interlocked with the annular body to prevent relative movement between the insulating material and the annular body. The body of insulating material is preferably polyurethane foam which is foamed in place around the annular body and interlocked with grooves formed on the body. An insulation protecting covering may be disposed about the polyurethane foam body to protect the insulating material from damage due to weathering, etc. In one preferred embodiment of the invention the protective covering is defined by a sleevelike element which tightly surrounds the coupling insulation. The sleeve-like element is placed on the coupling during production and serves to protect the coupling from damage due to handling and during shipment as well as to protect the coupling from the elements after installation.

An important feature of the invention resides in the unitary construction of the coupling. Since the coupling unit is not formed integrally with the conduit units, the construction of the conduit units themselves is substantially simplified and at the same time the procedures for coupling the conduit units together is simplified because of the ease and flexibility of handling the coupling unit during installation of the conduit system. If the coupling unit is damaged during shipment, or as a result of unsuccessful attempts to couple conduit units in the field, the coupling unit may merely be discarded in favor of another coupling unit without requiring either of the associated conduit units to be scrapped or repaired.

In one preferred embodiment of the invention the ends of the conduit sections are closed by sealing plugs which are tightly engaged between the conduit casing and the internal pipe. The coupling unit, which may likewise employ sealing plugs between the coupling body and the outer jacket, abuts the conduit plugs to aid in proper location of the pipe ends during assembly and to support the conduit plugs against being dislodged or loosened due to thermal expansion of the pipes.

Other important features and advantages of the invention will become apparent from the following detailed description and the accompanying drawings.

DETAILED DESCRIPTION OF PREFERRED EMBODIMENTS

Figure 1:
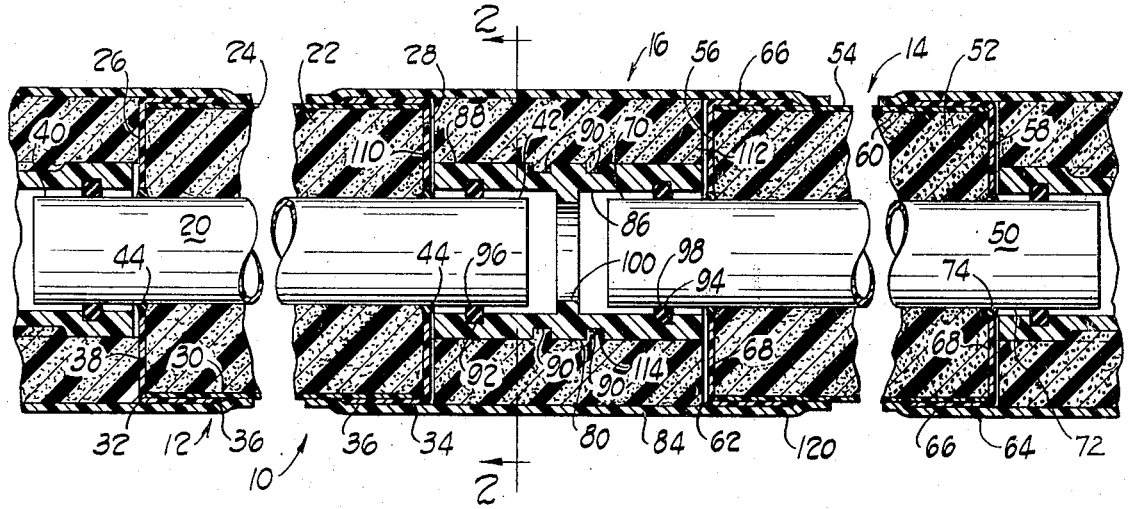
FIG. 1 is a cross sectional view of a conduit system embodying the present invention.

A portion of a conduit system 10 is illustrated in FIG. 1 and comprises a conduit unit 12, a conduit unit 14 and a coupling unit 16 between adjacent ends of the conduit units 12, 14.

The first conduit unit 12 comprises a length of pipe 20 which in the preferred embodiment is a corrosion resistant pipe which can be constructed of suitable material such as copper. The pipe 20 is surrounded by a body 22 of insulating material which is preferably a polyurethane foam material foamed in place about the pipe. An insulation protecting jacket or casing 24 is disposed about the body 22 to protect the body from damage during shipment as well as from weathering and water infiltration after installation of the conduit system. The body 22 is preferably cylindrical and defines axial end faces 26, 28.

Figure 2:
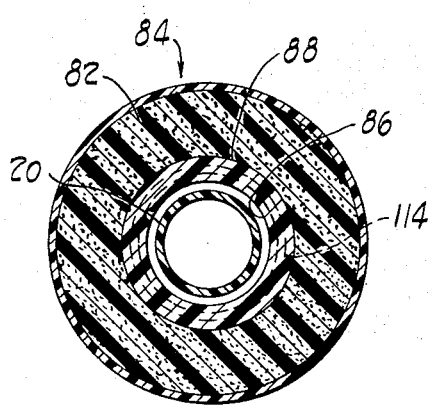
FIG. 2 is a cross sectional view seen from the plane indicated by the line 2—2 of FIG. 1.

The insulation protecting jacket, or casing, 24 is preferably formed by an imperforate plastic sleeve 30 and end caps 32, 34 at opposite axial ends of the body 22. In the embodiment of the invention illustrated in FIGS. 1 and 2, the sleeves 30 and end caps 32, 34 are formed of a polyvinylchloride plastic, however, other suitable materials could be used. Each of the end caps 32, 34 are identical and each includes an axially extending portion 36 which is disposed about the periphery of the body 22 and sealingly engages the sleeve 30, and a radially extending end cap portion 38 which extends across and completely covers the associated one of the axial end faces of the body 22.

The pipe 20 includes pipe end portions 40, 42 which project a predetermined distance from opposite ends of the body 22. The radially extending portion 38 of each of the end caps extends to and sealingly engages the respective associated pipe end portion. In the embodiment illustrated in FIG. 1, a flexible, pliant bead 44 of adhesive sealing compound is disposed between the radially extending portion 38 of the end caps and the pipe end portion. The bead 44 maintains a seal between the end cap and the pipe while permitting axial expansion and contraction of the pipe 20 relative to the body 22 and jacket 24.

The second conduit unit 14 is identical to the conduit unit 12 and comprises a pipe 50, a body of insulating material 52 surrounding the pipe and an insulation protecting casing or jacket 54 surrounding the body 52. The body is generally cylindrical and defines axial end faces 56, 58. The insulation protecting jacket 54 comprises an imperforate plastic sleeve 60 surrounding the body 52 and plastic end caps 62, 64 at opposite ends of the body 52. The sleeve 60 and end caps 62, 64 are preferably constructed from polyvinylchloride plastic. Each of the end caps includes an axially extending portion 66 and a radially extending portion 68 which are respectively sealingly engaged with the sleeve 60 and the pipe end portions 70, 72.

A bead 74 of sealing material seals the juncture of each of the radially extending end cap portions 68 and the respective pipe end portions. The beads 74 are identical to the beads 44 and maintain the seal between the pipe 50 and jacket 54 while permitting thermal expansion and contraction of the pipe axially relative to the end caps.

The coupling unit 16 comprises an annular cylindrical coupling body 80 formed from a corrosion resistant material such as copper, plastic, stainless steel, etc. which is surrounded by a third body of insulating material 82 which in turn is surrounded by an insulation protective covering 84.

The coupling body is a generally tubular member which defines an interior passage 86 which is coaxial with and of larger diametrical extent than the pipe end portions of the conduit units, and an external peripheral face 88 having circumferential grooves 90 extending around it at spaced locations between the ends of the annular body. The internal passage 86 is provided with axially spaced ring grooves 92, 94 which receive respective seal rings 96, 98 for establishing a sealing relationship between the interior passage 86 and the respective pipe end portions 42, 70. The construction of the annular coupling body 80 and the seal rings 96, 98 is such that the thermal expansion and contraction of the pipes 20, 50 in an axial direction results in relative axial movement of the pipes relative to the coupling body without destroying the seal between the coupling body and either of the pipes.

In the preferred and illustrated embodiments of the invention, the coupling body 80 is provided with a pipe expansion stop which, as illustrated in FIG. 1, is formed by a radially inwardly projecting flange 100 formed midway between the ends of the coupling body. It should be noted that the axial length of the coupling body 80 and its surrounding body of insulating material 82 is larger than the combined lengths of the projecting pipe end portions 42, 70 so that the predetermined amount of thermal expansion of the pipes 20, 50 can be accommodated by the coupling unit.

The body of insulating material 82 is preferably formed by foamed-in-place polyurethane material which defines a cylindrical exterior periphery 108 and axial end faces 110, 112 at opposite ends of the coupling unit. When the material of the body 82 is foamed in place about the coupling body, circumferential ribs 114 are formed on the body 82 by the grooves 90 in the coupling body. Abutment of the ribs 114 with the generally radially extending sides of the grooves 90 interlocks the body 82 with the coupling body 80 to prevent axial movement of the insulating material relative to the coupling body. The foamed-in-place material frictionally grips the coupling body to prevent relative rotation between the coupling body and the insulation material.

The insulation protecting covering 84 is constructed and arranged so that the body 82 is protected from damage and is also sealed against damage from the elements after installation. In the embodiment of the invention illustrated in FIG. 1 the protective covering 84 comprises a sleeve 120 of plastic material which extends axially beyond the end faces 110, 112 of the body 82 and is sealingly engaged about the insulation projecting jackets 24, 54 of the conduit units 12, 14. The sleeve 120 is applied to the coupling after assembly of the conduits 12, 14 to the coupling and is constructed and arranged so that it tightly surrounds the body 82. The sleeve 120 can be formed of a heat or chemically shrinkable material so that the sleeve can be shrunk into place about the conduit units and the coupling to sealingly engage the exterior peripheral portions of these units. Alternatively the sleeve 120 can be heat sealed to the jackets 24, 54 or can be fixed in place by a suitable adhesive material.

Figure 3:
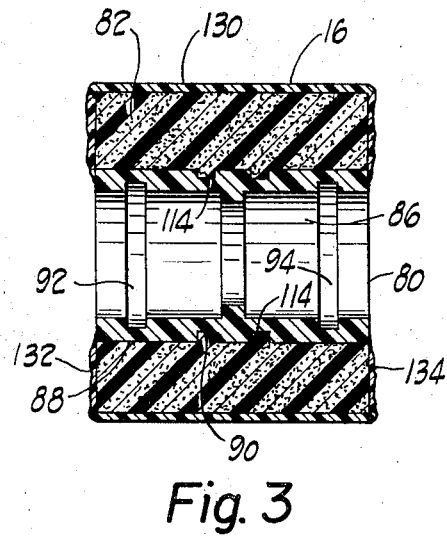
FIG. 3 is a cross sectional view of an alternative construction of a coupling unit embodying the invention.

Referring now to FIG. 3, an alternate construction of the coupling unit 16 is illustrated in which parts identical to parts already illustrated and described in connection with FIG. 1 bear identical reference characters. The coupling unit of FIG. 3 has a protective covering 84 which is formed by a sleeve 130 of polyvinylchloride plastic extending between the axial ends of the body 82. Rings 132, 134 of a suitable sealing compound extend radially along the axial end faces 110, 112 of the insulation body 82 to provide a continuous seal from the axial ends of the sleeve 130 to the coupling body 80. The rings 132, 134 and the sleeve 130 are applied to the coupling unit during manufacturing and function to protect the coupling both during shipment and after installation.

Figure 4:
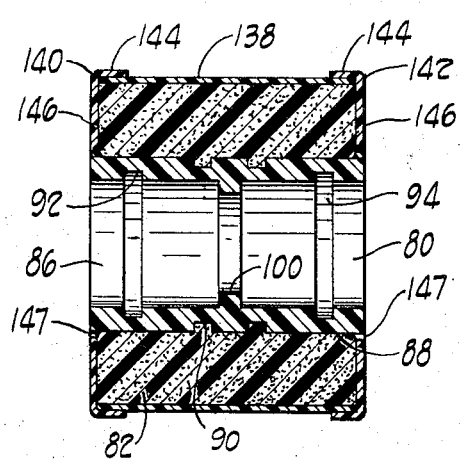
FIG. 4 is a cross sectional view of another alternative construction of a coupling unit embodying the present invention; and, FIG. 5 is a cross sectional view of a portion of yet another conduit system embodying the present invention.

Another embodiment of the coupling unit is illustrated in FIG. 4. A polyvinylchloride sleeve 138 extends about the insulation body 82 between its axial ends and end caps 140, 142 are disposed about the opposite axial ends of the coupling unit. Each end cap includes an axially extending portion 144 which is sealed to the sleeve 138 and a radially extending portion 146 which completely covers the respective axial end faces of the body 82 and is sealingly engaged about the coupling body 80 so that the body 82 is completely encapsulated. In the preferred and illustrated construction, the radially inner edges of the radial extending portions 146 are sealed to the periphery of the coupling body 80 by beads 147 of pliant adhesive sealing compound like the beads 44 referred to in connection with FIG. 1.

Figure 5:
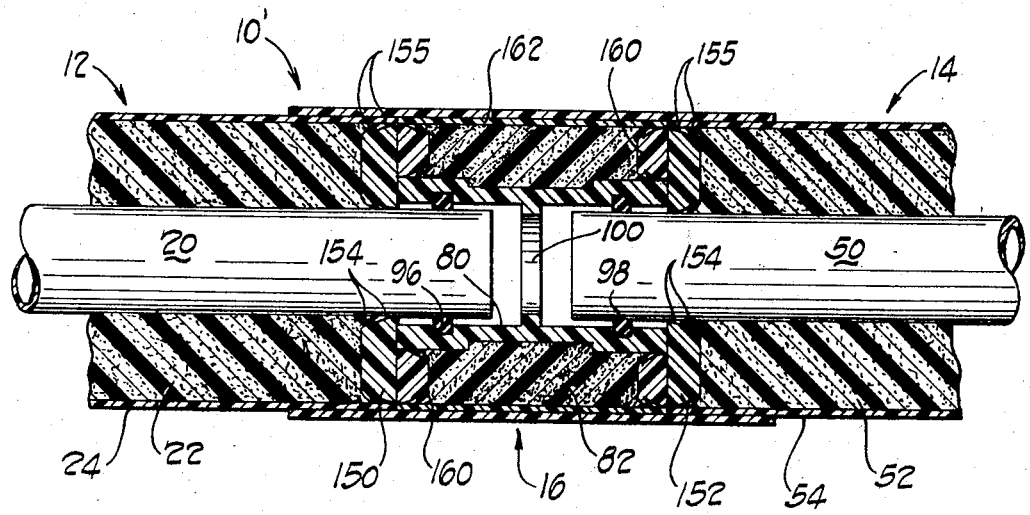

FIG. 5 illustrates a portion of a conduit system 10' constructed according to the invention. The conduit units 12, 14 are constructed substantially the same as those illustrated by FIG. 1 except that the bodies of insulating material 22 and 52, respectively, terminate short of the axial ends of the jackets, or casings, 24, 54, respectively. The conduit units are sealed by annular resilient rubber or plastic sealing plugs 150, 152 at each end of the respective conduit units 12, 14. The plugs are forced into the conduit ends to frictionally engage and seal about the conduit jackets and the internal pipes. The plugs each preferably define circumferential sealing lips 154 about their inner peripheries which are engaged with the pipes, and circumferential sealing lips 155 about their outer peripheries which are sealingly engaged with the casings respectively.

The coupling unit 16 is constructed like the coupling units of FIGS. 3 and 4 except that annular resilient rubber or plastic end plugs 160, are forced between the outer P.V.C. sleeve 162 and the coupling body 80 to seal the coupling unit. The plugs 160 are of the same construction as the conduit plugs 150, 152, but have larger internal diameters which sealingly extend about the coupling body.

When the conduit system of FIG. 5 is assembled the axial ends of the coupling body 80 about the plugs 150, 152. This serves to properly locate the coupling unit with respect to the pipes 20, 50. When the pipes 20, 50 are heated by fluid passing through them, thermal elongation of the pipes occurs which tends to dislodge the plugs 150, 152. The plugs are prevented from being dislodged by the coupling body 80 which is engaged between the plugs. The pipes 20, 50 remain free to elongate relative to the coupling body 80.

As is noted previously the separate conduit coupling units of the character referred to permit the use of relatively lengthy conduit units without substantial wastage because the conduit units can be cut and the separate sections thus formed can be installed in the conduit system. For example, when 20 foot long sections of conduit are employed in a system and a 5 foot section is required between a coupling unit and a conduit anchor, or a change of direction, a conduit section is cut into a 5 foot section and a 15 foot section. The 5 foot section is anchored in place. The cut-off end of the 15 foot section is further cut back so that the pipe projects a desired distance from the insulation material and casing. The casing and insulating material are then sealed to the pipe by a ring of sealing compound like the rings 132, 134, and the cut off conduit section is ready for installation in the conduit system.

If desired, the foamed insulation at the cut off end of the conduit section can be partly removed and a plug, like the plugs 150, 152, can be forced over the projecting pipe end and into the casing to seal the end of the section.

While several preferred embodiments of the invention have been illustrated and described in detail, the invention is not to be considered limited to the precise constructions shown. Various modifications, adaptations and uses of the invention may occur to those skilled in the art to which it pertains and it is the invention to cover hereby all modifications, adaptations and uses which come within the scope or spirit of the appended claims.

What is claimed is:

1. In a conduit system wherein a plurality of insulated conduit units are laid end to end and adjacent ends of the conduit units are joined and sealed;

a. a first conduit unit comprising a length of pipe, a body of insulating material extending circumferentially about said pipe and axially along said pipe, a sleeve-like jacket extending circumferentially about said body of insulating material, said pipe defining end portions extending a predetermined distance axially from said body of insulating material and sealing means extending circumferentially between the pipe and the jacket for sealing said body of insulating material;

b. a second conduit unit comprising a second length of pipe, a second body of insulating material extending circumferentially about said pipe and axially along said pipe, a second sleeve-like jacket extending circumferentially about said body of insulating material, said second pipe defining end portions extending a predetermined distance axially from said second body of insulating material and second sealing means extending circumferentially between the second pipe and second jacket for sealing a jacket portion at each axial end of said second body of insulating material; and, c. a coupling unit interposed between said first and second conduit units, said coupling unit comprising a tubular body member defining an axial opening extending therethrough for slidably receiving adjacent end portions of said first and second pipes, said adjacent end portions of said first and second pipes being spaced apart and unconnected within said tubular member, first and second seals axially spaced from each other along said tubular body and extending between said tubular body and said first and second pipes, respectively, said first and second seals providing a fluid tight seal between said tubular body and said pipes while permitting said adjacent end portions of said pipes to move endwise within said tubular body, a third body of insulating material extending about said tubular body and interlocked with said tubular body whereby said tubular body and said third body of insulating material are fixed against movement relative to each other, and insulation protecting means extending at least circumferentially about said third body of insulating material, at least one of said tubular body and said third body of insulating material having an axial length which is greater than the combined projecting lengths of said adjacent end portions of said first and second pipes whereby said first and second pipes are free to thermally expand and contract axially relative to said coupling unit.

2. In a conduit system as claimed in claim 1 wherein said tubular body further comprises expansion stop means for limiting the extent of axial movement of said first and second pipes relative to said tubular body.

3. In a conduit system as claimed in claim 1 wherein said third body of insulating material comprises polyurethane and said insulation protecting means comprises a sleeve of imperforate plastic material extending about said third body of insulating material.

4. In a conduit system as claimed in claim 3 wherein said sleeve of plastic material extends axially beyond opposite ends of said coupling unit and sealingly engages the peripheries of said first and second conduit units.

5. In a conduit system as claimed in claim 3 wherein said imperforate sleeve extends between opposite axial ends of said coupling unit and said insulation protecting means further comprises annular end cap members disposed at said opposite axial ends of said coupling unit, each end cap member comprising an axially extending portion sealingly engaged with said imperforate sleeve and a radially extending portion sealingly engaged with said tubular body.

6. In a conduit system as claimed in claim 3 wherein said imperforate sleeve extends between opposite axial ends of said coupling unit and said insulation protecting means further comprises first and second bodies of sealing compound at said opposite axial ends of said coupling unit, said bodies of sealing compound sealingly engaging said imperforate sleeve and covering respective axial end faces of said third body of insulating material.

7. In a conduit system as claimed in claim 1 wherein said insulation protecting means comprises at least a body of sealing compound sealingly engaging said third body of insulating material.

8. In a conduit system as claimed in claim 1 wherein said annular body comprises a plurality of generally radially extending surfaces formed on its external periphery, said third body of insulating material closely surrounding said tubular body and abutting said radially extending surfaces.

9. In a conduit system as claimed in claim 8 wherein said third body of insulating material comprises polyurethane foam material which is foamed in place about said tubular body.

10. In a conduit system as claimed in claim 1 wherein said first and second sealing means each comprises an annular plug member, each plug member being sealingly engaged with its respective pipe and conduit jacket, sealing plugs of adjacent conduit ends engaged by said coupling body member.

11. In a conduit system as claimed in claim 1 wherein said coupling insulation protecting means comprises a sleeve extending peripherally about said third body of insulating material and first and second plug members at opposite ends of said coupling unit, said plug members extending about said coupling body member and sealingly engaged between said coupling body member and said sleeve.

* * * * *